United States Patent [19]

Wu

[11] Patent Number: 5,014,529
[45] Date of Patent: May 14, 1991

[54] EXTENSIBLE CAR LOCK

[76] Inventor: Wen-Yin Wu, 8F-2, No. 22, Chung Cheng 2nd Road, Kaohsiung, Taiwan

[21] Appl. No.: 596,944

[22] Filed: Oct. 12, 1990

[51] Int. Cl.⁵ ............................................. B60R 25/02
[52] U.S. Cl. ........................................ 70/209; 70/226
[58] Field of Search ............... 70/209, 207, 210, 211, 70/212, 225, 226

[56] References Cited

U.S. PATENT DOCUMENTS

| | | | |
|---|---|---|---|
| 4,304,110 | 12/1981 | Fein | 70/209 |
| 4,823,523 | 4/1989 | Latta | 70/226 |
| 4,887,443 | 12/1989 | Wang | 70/209 |

FOREIGN PATENT DOCUMENTS 2039840 of 0000 United Kingdom ................. 70/209

*Primary Examiner*—Robert L. Wolfe
*Attorney, Agent, or Firm*—Kirschstein, Ottinger, Israel & Schiffmiller

[57] ABSTRACT

An extensible car lock comprising a lock handle and an extensible rod assembled with the lock handle and inserted extensible in the interior of the lock handle such that the whole length of the car lock can be adjusted by pulling the extensible rod outward or inward to mount this car lock on the steering wheel with help of two hooks provided on the lock handle and the extensible rod, and then the dead bolt of the lock provided at the front end of the lock handle can be extended through a hole in the lock handle and one of the plurality of dead bolt holes in the extensible rod for locking the car lock on the steering wheel.

2 Claims, 4 Drawing Sheets

EXTENSIBLE CAR LOCK

BACKGROUND OF THE INVENTION

Nowadays, there are many kinds of car locks in use and on market, which have almost the same principle that the lock is hooked on the steering wheel, extending out of it for preventing the stearing wheel from rotating. Most of them have two sections combined together, and the hooks for engaging with the steering wheel is U-shaped (U.S. Pat. No. 4,738,127), Y-shaped (U.S. Pat. No. 4,887,443), helically shaped (U.S. Pat. No. 4,747,279), etc., and the dimension, length or manipulating method of them are rarely developed (U.S. patent application Ser. No. 01/459646). So common car locks in use today are considered to have the following disadvantages.

1. To mount a car lock on the steering wheel, the extensible rod should be rotated to align the hook thereon with that on the lock handle.

2. The whole length of a car lock cannot be shortened as desirable, as the hook on the extensible rod is provided at its free end, impossible to be shrunk wholly in the lock handle.

3. The structure of the extensible rod makes its cost high, and the time for manufacture long, as it has a section of annular grooves to be stuck in by the dead bolt of the lock after it is rotated in the lock handle adjusting the whole length of the car lock in mounting it on the steering wheel.

SUMMARY OF THE INVENTION

In view of the disadvantages of conventional car locks, this invention has been devised to have the following advantages.

1. To shorten its length in the shrunk position to almost half the length in the extended position.

2. To save the need of rotating the extensible rod in relation to the lock handle by making the both always aligned in the same direction for the hooks provided on them.

3. To reduce the manufacturing cost by designing it to have the shortest size.

4. To increase practical effectiveness in use by saving space for putting away when it is not used.

The extensible car lock in the present invention comprises a lock handle and an extensible rod as its main parts. The lock handle and the extensible rod have a hollow square or circle or other shape in its cross-section and the extensible rod is of smaller size to fit and move lengthwise in the interior of the lock handle, extending therein through an opening at one end of the lock handle.

The lock handle has a hook at the front section, a lengthwise slot at the front end on the same side as the hook is for a hook on the extensible rod to fit and move therein when the extensible rod is pushed to shrink in the lock handle, and a lock at the front end on the side opposite to the hook.

The extensible rod has a hook at the front section aligned to the hook on the lock handle, a dead bolt hole near the front end and a plurality of dead bolt holes properly spaced apart in the middle and rear section on the side opposite to the hook for selectably inserted in one of them by the dead bolt of the lock when this car lock is mounted on the steering wheel for locking.

When this car lock is going to be used for locking the steering wheel, the extensible rod is to be pulled outward in the lock handle to a proper length to suit the diametraical length of the steering wheel such that the two hooks on the lock handle and the extensible rod can be hooked on the steering wheel body. Then the lock is to be locked, making its dead bolt extending out through the dead bolt hole in the lock handle and one of the dead bolt holes in the extensible rod.

DETAILED DESCRIPTION OF THE INVENTION

Figure 1:
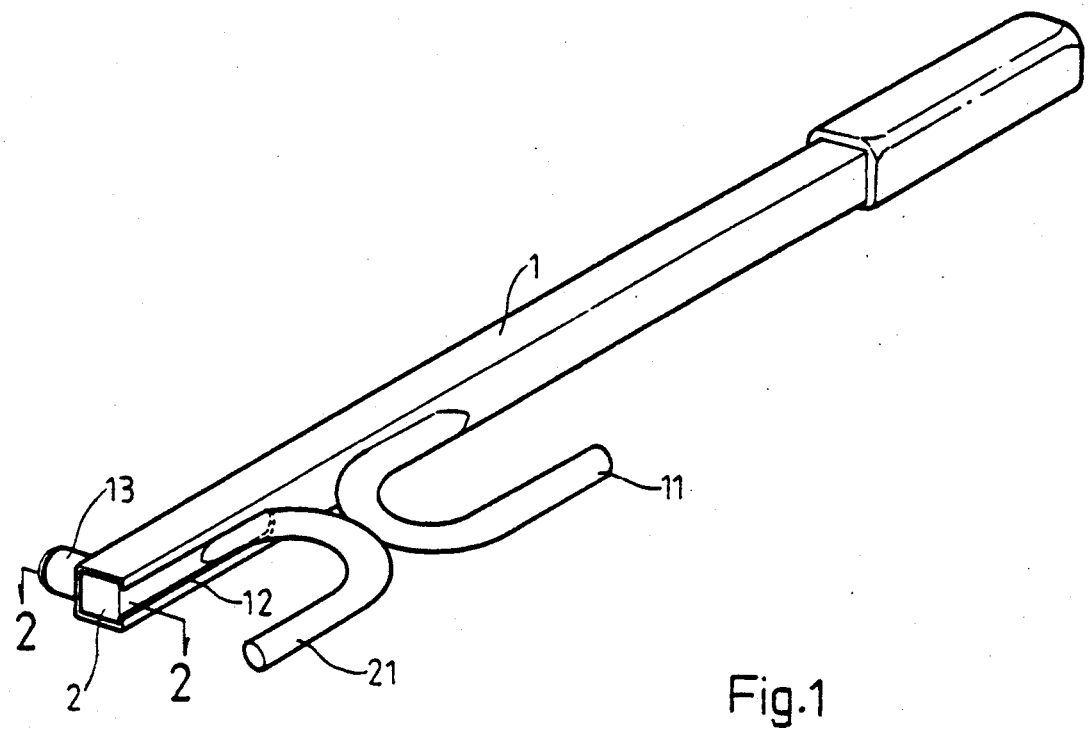
FIG. 1 is a perspective view of the first embodiment of the extensible car lock in accordance with the present invention.
Figure 2:
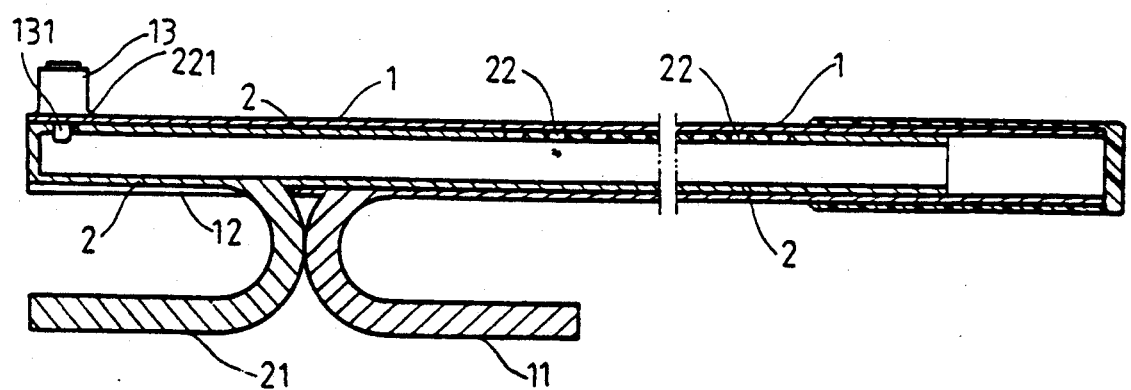
FIG. 2 is a cross-sectional view of 2—2 line on FIG. 1.
Figure 3:
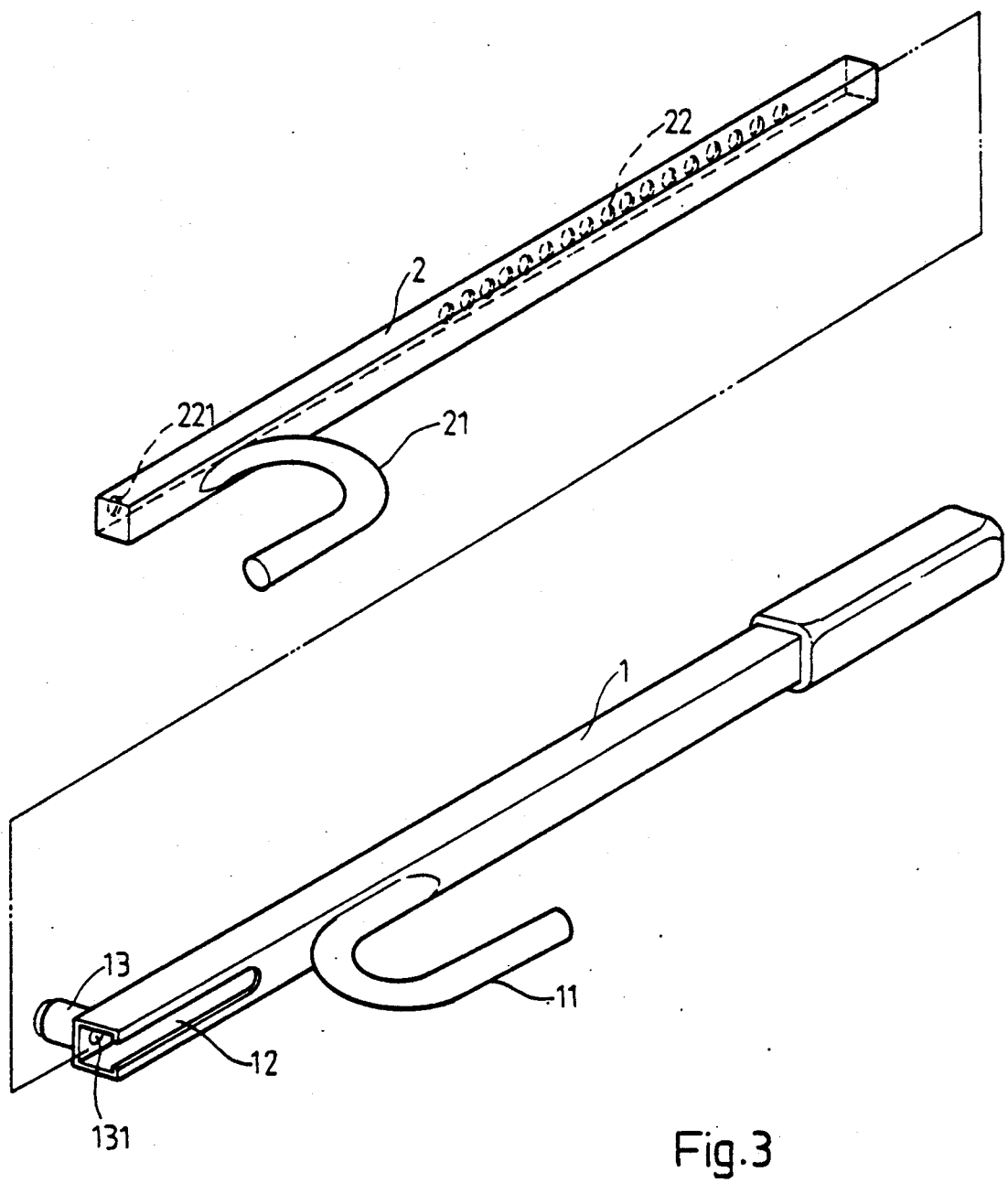
FIG. 3 is an exploded view of the first embodiment of the extensible car lock in accordance with the present invention.

The first embodiment of the extensible car lock in the present invention shown in FIGS. 1-3 comprises a lock handle 1 and an extensible rod 2 as tis main components.

The lock handle 1 has a cross-section of hollow square, a hook 11 of U-shape or any shape that can be hooked on the body of the steering wheel, a lengthwise slot 12 at the front end of a proper length and before the hook 11 on the same side as the hook 1 for a hook 21 on the extensible rod 2 to slidably insert therein, and a lock 13 at the front end on the opposite side of the slot 12 for locking the extensible rod 2 at a proper length.

The extensible rod 2 has the same cross-section as but a size smaller than the lock handle 1 so that it can fit and move to and fro lengthwise in the interior of the lock handle 1.

The extensible rod 2 also has at the front end a hook 21 of U-shape or any other shape as long as it can hook on the steering wheel body, a dead bolt hole near the front end on the side opposite to the side on which the hook 221 is provided for the dead bolt of the lock to stick in for locking the extensible rod immovable when it is extended innermost in the interior of the lock handle 1, and a plurality of dead bolt holes 22 at the section from the middle to the rear on the same side as the hole 221 for the dead bolt of the lock to selectably stick in to keep the extensible rod immovable when it is extended outward properly to lock this car lock on the steering wheel.

As can be realized in the above description, the whole length of this car lock can be much shorter than a conventional one when the extensible rod 2 is pushed to shrink innermost in the lock handle 1 when it is unlocked of the steering wheel.

Figure 4:
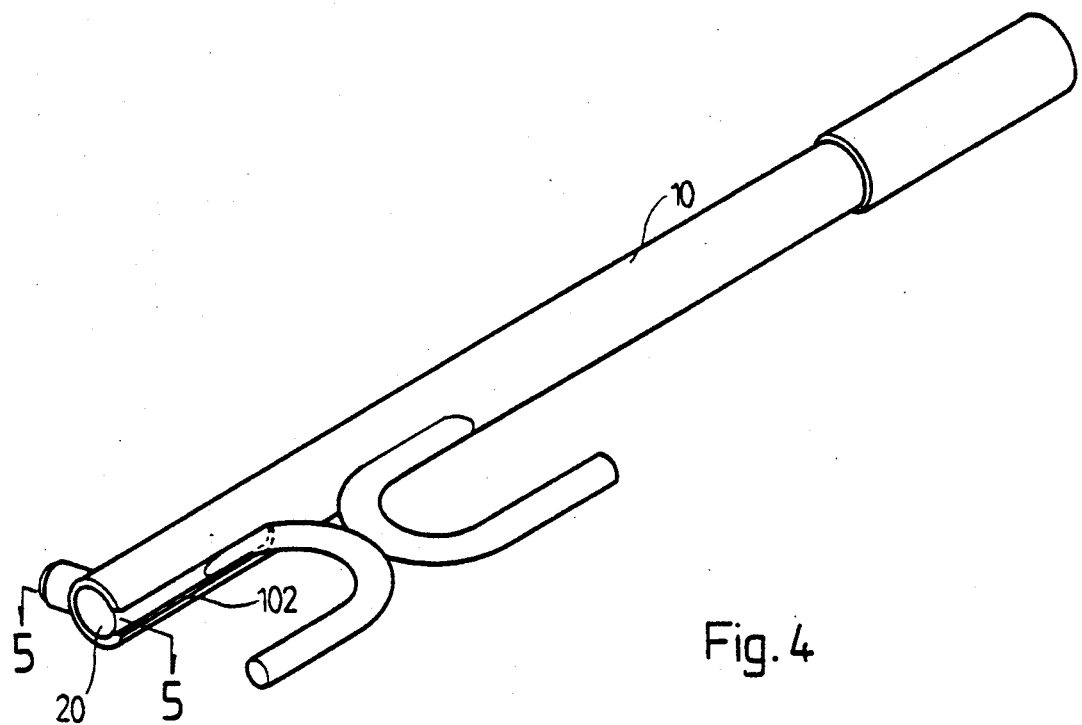
FIG. 4 is a perspective view of the second embodiment of the extensible car lock in accordance with the present invention.
Figure 5:
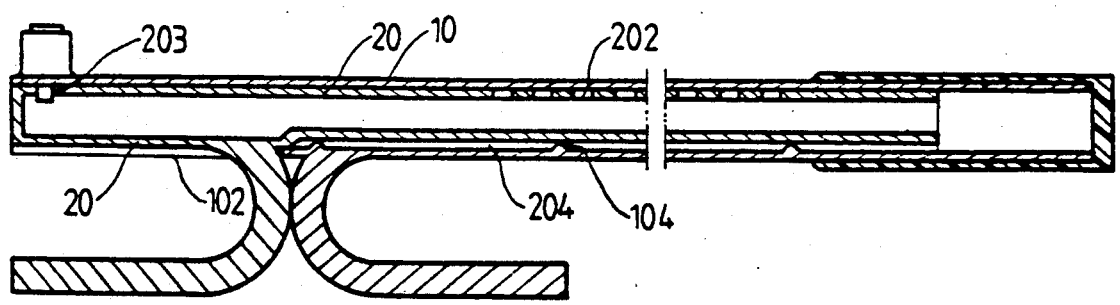
FIG. 5 is a cross-sectional view of the second embodiment of the extensible car lock in accordance with the present invention.
Figure 6:
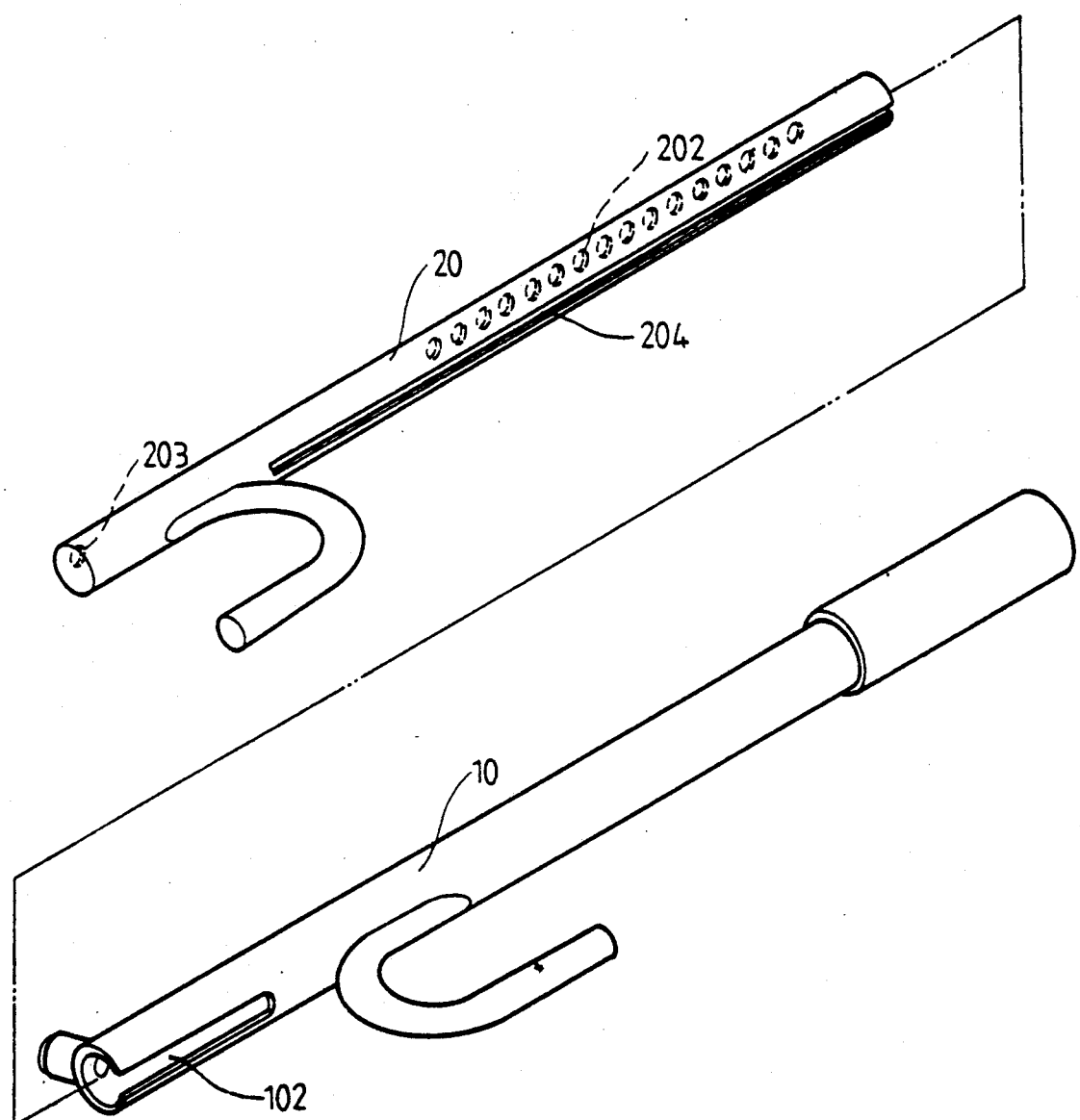
FIG. 6 is an exploded view of the second embodiment of the extensible car lock in accordance with the present invention.

The second embodiment of the extensible car lock in the present invention shown in FIGS. 4–6 comprises also a lock andle 10 and an extensible rod 20 as its main components, but they have a cross-section of a hollow circle instead of a hollow square in the first one. The lock handle 10 has a hook, a slot 102 and a lock in the same position as the first one, and so does the extensible rod 20 a hook, a head bolt hole at the front, a plurality of dead bolt holes in the middle and the rear section. The only different structure is a lengthwise quide slot 204 bored in the extensible rod 20 aligned to the hook and a projection 104 provided on the inner surface to insert in and move along the slot 204 such that the lock handle 10 and the extensible rod 20 can always have their hooks aligned even when the extensible rod 20 is shrunk innermost or extended outermost of the lock handle 10.

The extensible car lock in the present invention has a special feature of its short length when the extensible rod is pushed innermost and hidden in the lock handle for putting away, and thus has better convenience for using on the steering wheel to lock it.

I claim:

1. An extensible car lock to be mounted on the steering wheel comprising;
    a lock handle having a cross-section of a hollow square or a circle or any other shape a hook having any shape for hooking on the steering wheel body at the front section, a lengthwise slot at the front end on the same side as the hook for a hook on an extensible rod to fit and move along therein, a lock provided near the front end on the side opposite to the hook and having its dead bolt able to extend in the interior of the lock handle;
    an extensible rod of the same shape as but of a smaller size than the lock handle to fit and move lengthwise to and fro in the interior of the lock handle having a hook of any shape at the front section to hook on the steering wheel body and aligned to the hook on the lock handle, a dead bolt hole near the front end on the side opposite to the hook and a plurality of dead bolt holes properly spaced apart in the middle and the rear section on the side opposte to the hook for the dead bolt of the lock to selectably stick in; and
    said extensible rod possible to be inserted and moved in the interior of the lock handle through its front opening so as to adjust the whole length of this car lock in mounting it on the steering wheel and then said lock possible to be locked with a key making the dead bolt extending in the dead bolt hole in the lock handle and one of the dead bolt holes in the extensible rod for locking the steering wheel immovable with help of the two hooks.

2. The extensible car lock as claimed in claim 1, wherein the lock handle is provided with at least one projection on the inner surface and the extensible rod is provided with a lengthwise guide slot for the projection to insert and move therein to and fro such that the extensible rod can be shrunk innermost or extended outermost in the interior of the lock handle in the certain aligned direction.

* * * * *